US012756807B2

(12) United States Patent
Finlayson et al.

(10) Patent No.: US 12,756,807 B2
(45) Date of Patent: *Oct. 6, 2026

(54) OPTIMIZED COLOR FILTER INCLUDING A BOUNDED TOTAL TRANSMITTANCE OF LIGHT SET BY A TARGET PERCENTAGE FOR MODIFYING THE SPECTRAL RESPONSE OF A VISION SYSTEM

(71) Applicant: UEA Enterprises Limited, Norwich (GB)

(72) Inventors: Graham Finlayson, Norwich (GB); Yuteng Zhu, Norwich (GB)

(73) Assignee: UEA Enterprises Limited, Norwich (GB)

( * ) Notice: Subject to any disclaimer, the term of this patent is extended or adjusted under 35 U.S.C. 154(b) by 629 days.

This patent is subject to a terminal disclaimer.

(21) Appl. No.: 17/977,534

(22) Filed: Oct. 31, 2022

(65) Prior Publication Data

US 2024/0146890 A1 May 2, 2024

(51) Int. Cl.
*H04N 9/68* (2023.01)
*H04N 25/11* (2023.01)

(52) U.S. Cl.
CPC ............... *H04N 9/68* (2013.01); *H04N 25/11* (2023.01)

(58) Field of Classification Search
CPC . H04N 9/67; H04N 9/68; H04N 25/11; G02B 5/20
See application file for complete search history.

(56) References Cited

U.S. PATENT DOCUMENTS 7,130,467 B1 * 10/2006 Bronder ................. H04N 19/94 382/218

FOREIGN PATENT DOCUMENTS

WO WO-2020099860 A1 * 5/2020 ......... G02B 27/0012

* cited by examiner

*Primary Examiner* — Christopher Wait
(74) *Attorney, Agent, or Firm* — THOMAS | HORSTEMEYER, LLP

(57) ABSTRACT

A system and method for generating an improved color filter for modifying the spectral response of a vision system are disclosed. the method includes receiving an RGB spectral response of the vision system for a color target under predetermined illumination, generating a model, using the RGB spectral response, of the vision system when subject to a filter, the model including a bounded total transmittance of light by the filter that is set by a predetermined parameter and executing, by a processor of a computer system, computer program instructions configured to apply the model to a bilinear optimisation problem that simultaneously determines:

i) a color correction matrix to transform the RGB spectral response to XYZ color space; and,
ii) parameters of the color filter.

The method further executes computer program instructions configured to solve the bilinear optimisation problem and, then provides a color filter using the parameters.

16 Claims, 3 Drawing Sheets

OPTIMIZED COLOR FILTER INCLUDING A BOUNDED TOTAL TRANSMITTANCE OF LIGHT SET BY A TARGET PERCENTAGE FOR MODIFYING THE SPECTRAL RESPONSE OF A VISION SYSTEM

FIELD OF THE INVENTION

The present invention related to a system and method for generating an optimized color filter for modifying the spectral response of a vision system and in particular to a system and method in which the filter is designed to make the vision system more colorimetric.

BACKGROUND TO THE INVENTION

Digital cameras measure color of the real world scenes by using three color channels, known as Red, Green and Blue (RGB).

The spectral sensitivities of a camera are designed to satisfy many objectives including manufacturability and the need to minimize the conspicuity of noise when the raw RGBs are transformed for display. As a consequence, most cameras do not 'see' like we do.

As a result, typical cameras (for example, in smartphones or single-lens reflex cameras) are not colorimetric. Rather, in typical signal processing pipelines, the RGBs measured can only be approximately corrected to the corresponding XYZ tristimulus values (or equivalently sRGB). Invariably, a simple 3×3 matrix is used for color correction. The XYZ and sRGB (the latter is a linear combination of the former) responses relate to the measurements made by a 'standard' human observer with respect to a color matching experiment. Thus, color correction is sometimes posed as mapping camera responses to the corresponding responses of a standard observer.

More generally, the responses of a first imaging system might be corrected to match those of a second by algorithmic means including using a 3×3 matrix. One set of sensitivities can be considered a reference standard and a calibration step can be carried out to map the responses of different sensor responses to the reference standard.

The responses of a filter-modified vision system—e.g. the vision system that sees the world through the color filter—can be color corrected (e.g. by a 3×3 matrix) to be closer to the responses of the standard observer. More generally, a filter can be placed in front of a first vision system so that its filter corrected responses are closer to those of a second vision system. In regard to a color camera, we seek a filter such that the recorded RGB signal in combination with a linear transform produces measurements that are closer to those made by a standard observer. We seek a filter to make the camera more colorimetric.

To consider the filter design problem we need to understand what it means if a camera sees the world—from a color point of view—like we do. Formally, it is an established result that a camera 'sees' like we do—with a simple linear color correction—if and only if the Luther condition is met i.e. its spectral sensitivities are a linear combination of the corresponding human visual system matching curves (or equivalently a linear combination of the XYZ color matching functions).

Digital cameras often use sensors having (or determining) Red, Green and Blue pixels that in turn produce RGB signals that correspond to the intensity of light sensed at that pixel. Mapping the raw RGBs measured by a camera to either display coordinates (such as sRGB) or the XYZ tristimuli—a human vision system referenced color space—is called color correction. Color correction is an essential procedure in the camera pipeline since cameras do not "see" the world as humans do. Fundamentally, this is because the relationship between the spectral sensitivities of a camera and human visual matching functions is not a linear mapping. Explicitly, the Luther condition is not satisfied.

Many different algorithms have been developed for solving the color correction problem. The most common method is to apply a linear correction transform mapping RGBs to XYZs (or display RGBs). While linear correction generally works well, it can still fail in a large number of cases, especially for saturated colors.

In the inventors' earlier patent application WO2020/099860, which is herein incorporated in its entirety by reference, a method of generating a filter to make a vision system more colorimetric was proposed. Filters produced using that method are able to make a vision system more colorimetric. However, when a filter is placed in front of a camera, the effective camera response functions become equal to the original camera sensitivities multiplied by the spectral transmittance of the filter on a per wavelength basis. Given the spectral sensitivity curves of a camera and the spectral transmittance distribution of an optimal filter obtained from the Luther-condition optimization the new effective camera sensitivity set by per-wavelength multiplication can be obtained.

Applying a filter results in lower sensitivity responses. Although it may be possible for exposure time to be increased or a higher ISO value set to compensate for the loss of light, this is not always possible. Additionally, a camera with low sensitivity functions may result in high noise levels (i.e. lower signal-to-noise ratio).

It is of great practical interest to design color filters which can transmit more of the incoming light while delivering improved colorimetric performance for digital cameras.

Equivalently, it is of interest to find a filter that makes a first imaging system sample light more like a second imaging systems. Specifically, that the filtered responses of the first system are more correctable to match the responses of the second system compared to when a filter is not used.

STATEMENT OF INVENTION

According to an aspect of the present invention, there is provided a method for generating a color filter for modifying the spectral response of a vision system, the method comprising:

- receiving an RGB spectral response of the vision system for a color target under predetermined illumination;
- generating a model, using the RGB spectral response, of the vision system when subject to a filter, the model including a bounded total transmittance of light by the filter that is set by a predetermined parameter;
- executing, by a processor of a computer system, computer program instructions configured to apply the model to a bilinear optimisation problem that simultaneously determines:
  - i) a color correction matrix to transform the RGB spectral response to XYZ color space; and,
  - ii) parameters of the color filter;
- executing computer program instructions configured solving the bilinear optimisation problem; and,
- providing a color filter using the parameters.

The bounded total transmittance may comprise a bound that the average light power transmitted by the filter must be greater than a target percentage.

The bounded total transmittance may comprise average transmittance across the spectral sensitivity of the reference imaging system.

The RGB and XYZ responses may, respectively, be for a camera and the standard observer, the color matching functions for different human observers or for a first and second imaging system.

The RGB spectral response may be obtained from an observer with different color response and XYZ color space is determined by an observer a normal color response.

The spectral response of the vision system modified by the filter may comprise spectral sensitivity.

The RGB responses may be for a color target that is illuminated by a reference set of illuminant spectra and has predetermined surface reflectances, comprising generating a bounded transmittance filter that linearly predicts the responses to the same spectral data for the XYZ imaging system.

The RGB responses may be for the product of the light and reflectance spectra (that are integrated to form RGBs of a color target) that are perturbed by a model of spectral noise, the method comprising generating a bounded transmittance filter that linearly predicts the responses to the noise free spectral data for the XYZ imaging system.

The RGB responses may be for a color target that is illuminated by a reference set of illuminant spectra and has predetermined surface reflectances where the RGB responses are perturbed by a filter-dependent noise component, comprising generating a bounded transmittance filter that linearly predicts the responses to the, noise-free, target spectral data for the XYZ imaging system.

The method may further comprise constraining the generated filter to be smooth.

The method may further comprise incorporating models of image noise into the model and solving the bilinear optimization problem to find a solution that is robust to the presence of noise.

The method may further comprise varying the predetermined parameter across a range of parameter values, solving the bilinear optimization for the model with each varied predetermined parameter and determining a filter from the solutions that optimises the ratio of filter transmittance over fitting error.

According to another aspect of the present invention, there is provided a system for generating a color filter for modifying the spectral response of a vision system, the system comprising:

an input interface configured to receive an RGB spectral response of the vision system for a color target under predetermined illumination;

a processor configured to execute computer program instructions configured to generate a model, using the RGB spectral response, of the vision system when subject to a filter, the model including a bounded total transmittance of light by the filter that is set by a predetermined parameter; and, computer program instructions to apply the model to a bilinear optimisation problem and solve the problem to simultaneously determine:

i) a color correction matrix to transform the RGB spectral response to XYZ color space; and, ii) parameters of the color filter; and, an output interface configured to provide the parameters for the color filter.

According to another aspect of the present invention, there is provided a lighting system comprising a lighting source having a controllable lighting output and a control system, the control system comprising: a processor configured to execute computer program instructions configured to generate a model, using the RGB spectral output of the lighting source when subject to a filter, the model including a bounded total transmittance of light by the filter that is set by a predetermined parameter; and, computer program instructions to apply the model to a bilinear optimisation problem and solve the problem to simultaneously determine:

i) a color correction matrix to transform the RGB spectral output to XYZ color space; and, ii) parameters of the color filter; and, an output interface configured to provide the parameters for the color filter to the lighting source to control output of the lighting source.

Previous approaches designed filters that transmitted a low-bound percentage of light at all wavelengths (e.g. the filter transmittance has to be greater than 20% at any wavelength). However, there is a trade-off here: the higher the low bound, the less well a filter can make a camera colorimetric.

In embodiments of the present invention, filter transmittance is considered differently. Rather than placing a lower bound at each wavelength, focus is instead placed on the overall transmittance (on average how much of an incident uniform white light can be transmitted by a filter). Preferably, a constraint that the average light power transmitted by the filter must be greater than a target percentage (e.g. 50%) is used and the optimization problem is formulated and solved subject to this transmittance constraint.

Significantly, compared to prior approaches, testing by the inventors has shown that embodiments of the present invention produce filters that deliver a further 10% improvement in color accuracy as well as meeting transmittance requirements. Not only does this demonstrate that the form of the optimization has a profound impact on the filters we produced but also that there is latitude in how filters might be designed.

Although embodiments are described with reference to generating a filter for an image sensor of a camera or the like, other applications are also possible. The filter may be in the form of setting for a tunable light source. A filter may also be used to improve or change the visual response of a human observer, for example the response of anomalous color blind observers. A filter might also be designed to map the sensitivities of a first camera system to better match those of a second camera system.

Embodiments may be directed to making an RGB camera more colorimetric, designing filters for human vision and correcting the RGB response for a first camera to match those of a second. Embodiments determine the desired filter in the same way. To simplify the discussion below, therefore, it is useful to consider all scenarios from the same viewpoint. In all cases we will refer to the response of our first imaging system as an RGB response and we seek to correct this response to match a second system which will measure XYZ.

For the colorimetric camera to standard observer scenario, the RGB response is the camera measurement and XYZ is the response of the standard observer. For the two imaging system (or two camera) scenario, the first imaging system measures RGB and the second XYZ (but here the XYZ measurements will not typically be related to the standard observer). In designing a filter for our third scenario—e.g. when we wish to correct the vision of a color blind observer—the first and second imaging systems (color blind vs color normal) are defined by their respective color matching functions.

Thus, our problem is always defined as finding a filter such that an RGB imaging system response can be more accurately color corrected to match the XYZ response of a second imaging system. Where RGB and XYZ are as discussed previously.

For both the RGB and XYZ systems we, in general, assume that their spectral sensitivities are known. The RGB spectral sensitivities are 3 functions of wavelength across the visible spectrum that record how the RGB system responds to light. Given a spectral power distribution (of light) the RGB response is defined by the integral of the RGB spectral sensitivities and with the spectral power distribution. Analogously, there are 3 XYZ spectral sensitivity functions and the XYZ response is the integral of these curves with the same spectral power distribution (SPD). The SPD is itself the multiplication of a light spectrum with a reflectance. Preferably, a filter might be found that best allows RGB to mapped to XYZ for a color target is illuminated by a reference set of illuminant spectra and has predetermined surface reflectances.

The problem may be formulated as a bilinear least-squares estimation problem. The step of executing computer program instructions configured solving the bilinear optimisation problem may comprises solving the bilinear optimisation problem using alternating least-squares. The step of executing computer program instructions configured solving the bilinear optimisation problem may comprise solving the bilinear optimisation problem using random, sampling and consensus.

The step of executing computer program instructions configured solving the bilinear optimisation problem may include executing computer program instructions to regulate the solution to control the shape of the filter, for example such that the filter is smooth.

The method may further comprise sampling across the RGB spectral response and XYZ color space across 400 nm to 700 nm light spectra at predetermined intervals to give A samples for each of the RGB and XYZ.

The predetermined interval may be a 10 nm interval.

The method may further comprise forming an RGB matrix and an XYZ matrix from the respective A sampled values and solving the optimisation problem from the matrices for the matrix M that best maps RGBs to XYZ tristimuli.

The step of solving may be by alternating least squares, ALS, the method further comprising:

- making an initial guess for a starting point from which to optimise the filter by ignoring a linear correction term M;
- holding the filter fixed and solving for M;
- estimating new corrected spectral sensitivities;
- repeating the ALS optimization until convergence.

The method may be operated to seek a filter to minimize a non-linear error metric including CIE Lab.

The step of providing the parameters may comprise selecting a closest singular match (choosing a single filter from a set of filters), or a closest match by combining filters, from a predetermined set of existing filters.

The step of providing may comprise providing the parameters to a manufacturing system to create the filter. As an example, OptiLayer is a powerful and widely used system for designing optical filters. Given a filter transmission curve (and other constraints such as optical thickness of deposited filter layers) the software will generate a specification which can be supplied to optical manufacturers.

The step of providing may also comprise generating control signals to cause a smart glass or programmable optical filters to operate according to the parameters.

The method may further comprise capturing two RGB response images, one image with and one without a filter between the vision system and the target, finding a 6×3 linear matrix mapping the 6 pixel measurements to the target XYZs, the 6 pixel measurements being the R, G, and B values from each image.

The step of capturing may comprise taking the two images successively.

The step of capturing may comprise splitting light from a scene into two optical paths and capturing one image from each of the two paths for simultaneous capture.

According to an aspect of the present invention, there is provided a method for spectrally modulating the light entering a first visual system so that the modified visual system's response is linearly related to the response of a second visual system observing the unmodulated light.

We can think of a color filter as modulating the spectrum of light reaching a camera or eye. In addition to filtering by interposing an optical artefact between the source and observer (or observer system), we can modulate the light source in the same ways as would prescribed by the filter.

The modulation is implemented by a transmissive filter placed in front of the first visual system. The modulation may also be implemented by spectrally adjusting the illuminant spectral power distribution lighting a scene. The modulation may be a combination of a transmissive filter and a spectral adjustment of the illumination lighting a scene.

The first visual system may be a color camera and the second may have spectral sensitivities that are linearly related to human visual system spectral sensitivities.

CIE XYZ color matching functions for the standard observer may be used.

Measured linear response mechanisms of the eye may be used (including linear combinations of these mechanisms). These measured responses may be the outputs from a color matching experiment.

The second visual system may be related to an observer with normal color vision and the first may be related to an observer who suffers from color blindness Embodiments may produce a modulated spectral response designed to aid a color blind observer to match colors—according to the color matching experiment—more like an observer with normal color vision.

Embodiments are also concerned with helping color blind observers see more but unlike in prior approaches, we tie the filter design process to the color matching problem.

The whole of colorimetry is based on color matching. If an observer sees a test light in one part of the visual field the color matching problem requires the observer to mix proportions of (typically) red, green and blue primary lights to produce a visual match to the test light.

If the test lights are, in succession, chosen to be the individual wavelengths across the visible spectrum then per-wavelength we can plot the mixture of R, G and B needed to match the light at that wavelength. The resulting curves are called color matching functions. Because the eye (and cameras) respond linearly to light it is easy to show that we can find the match mixture for an arbitrary test light by integrating the test light with the color matching functions.

Equivalently, the ideal camera sensitivities to measure the RGBs that can directly drive a display (with the aforementioned primaries) are exactly the color matching functions.

The color matching problem formulation has an interesting and useful property. If we make filter such that the new filtered sensitivities are linearly related to the standard observer then the color matches (the mixture combinations) found for the filtered sensitivities is the same as for the standard observer. Put another way a visual system with 3 spectral sensitivity functions implies a set of color matching functions given a set of primary lights. If we have a second visual system with sensitivities that are a linear transform from the first and run a color matching experiment we derive the same color matching functions. In a colorimetric sense both these vision systems see color in the same way.

Optimal spectral modulation may be found through optimisation using knowledge of the first and second visual system's spectral sensitivities.

Optimal spectral modulation may be found through optimisation using knowledge of the first and second visual system's spectral sensitivities and a reference set of illuminant spectra and surface reflectances.

While colorimetric in a strict physical sense pertains to the color matching experiment as described above. However, colorimetry does not account for other aspects of vision. Indeed, it is well known that is we see the same object on bright or dark surrounds our perceived color changes yet the colorimetric measurements stay the same. Generalising the concept of color matching means we would like to find a filter that best helps one visual system 'see' like another. As an example, in color appearance models the color and intensity of the surround colors are part of the computation that predicts the color we see. Color appearance models are, mathematically, complex non-linear formula. Thus, according to selected embodiments of the present invention, we also seek to find a filter that allows the measurements taken be a filter corrected vision system to be non-linearly corrected to match perceptual correlates.

Preferred embodiments may include a method for spectrally modulating the light entering a first visual system so that the modified visual system's response is non-linearly related to the response of a second visual system observing the unmodulated light.

Preferred embodiments may include a method for spectrally modulating the light entering a first visual system so that the modified visual system's response is non-linearly related to a non-linear function of a second visual system observing the unmodulated light The second visual system may be related to a human observer and the non-linear function applied to the responses of the second visual system models the non-linear processing carried out by the human visual system The first visual system may be a human observer who is color blind.

The first visual system may be a human observer who suffers from visual stress, including dyslexia The first visual system may be a human observer and the second is a human observer with reduced Melanopsin response.

Optimal spectral modulation may be found through optimisation using knowledge of the first and second visual system's spectral sensitivities and the non-linear processing applied to the second visual system's responses.

Optimal spectral modulation may be found through optimisation using knowledge of the first and second visual system's spectral sensitivities and the non-linear processing applied to the second visual system's responses and a reference set of illuminant spectra and surface reflectances.

In embodiments of the present invention, the aim is not to increase the dimensionality of capture. Rather a filter is found such that the device sensitivities multiplied by the filter and then linearly transformed by a 3× 3 matrix are as close as possible to the XYZ color matching functions. We call this method spectral-based colorimetric filter design.

Preferred embodiments approach filter design as a way of best trying to ensure a vision system such as a camera measures the same XYZs that we see for a single given illuminant condition.

An embodiment of the current invention finds the filter that when multiplied by the spectral sensitivities of a first visual system are close to being in linear relation to the visual sensitivities of a second visual systems (including the XYZ color matching functions). This embodiment makes the least assumptions about the world and in so-doing will find a filter that will allow a visual system to capture responses which are always almost a fixed linear combination of the target responses. However, this generality places a strong constraint on the shape of the filter.

Embodiments of the present invention include a method for finding the optimal filter given a set of typical surfaces and lights. In one embodiment, the problem is formulated as a bilinear least-squares estimation problem (linear in the filter and the color correction) and this, in a preferred embodiment, is solved using Alternating Least-Squares (ALS) technique. Alternative optimisations to Alternating Least Squares include the RANSAC optimisation approach. In this approach we, effectively, find m colors (a subset of the total) that we wish to minimise the error. For the discovered filter and linear correction we then assess the error of this filter and linear transform applied to the rest of the data. We repeat this method with a second, third and in general kth set of m colors. For each set we assess the discovered filter and linear transform relative to the data outside the set. RANSAC stands for Random, Sampling and Consensus.

For some cameras there exists a filter that makes them almost colorimetric and for all cameras there exists filters which render them more colorimeric. In selected embodiments of the present invention a filter is sought that will allow a camera to capture colorimetric data for all possible spectra. Yet, the spectra we measure in the world are not arbitrary. In particular, surface reflectances are smooth and can be well approximated by low dimensional linear models. Preferred embodiments of the present invention include a system and method for finding and generating a filter that makes a camera as colorimetric as possible for a given set of measured lights and surfaces. Using a more restrictive model of lights and surfaces (albeit one that captures all typical real-world situations) has the advantage of allowing greater flexibility in how the filters are designed. With respect to the constrained optimisation we can find highly transmissive and smooth filters that make cameras much more colorimetric and these filters are easier to manufacture.

Embodiments of the present invention seek to generate a filter that changes the spectral characteristics of the sensor itself and makes captured images more colorimetric without the need for post processing. For the application of making a color blind person more colorimetric it is also clearly impossible to assume that observer has access to filtered and unfiltered images.

In particular, embodiments of the present invention seek to find and generate a filter to make a camera more colorimetric. This is done in tandem with finding the best color correction transform taking RGBs to XYZs.

In preferred embodiments, simultaneous calculation of the color filter and color correction matrix is formulated as a bilinear optimisation problem and solved using Alternating Least-Squares (ALS). The optimisation is regulated to control the shape of the filter (e.g. its transmittance property).

Embodiments of the present invention seek to find a filter so that the effective RGB sensitivities (filter multiplied by the native RGB sensitivities) are a linear combination from a target set of spectral sensitivities (e.g. the CIE XYZ color matching functions). We might also consider capturing two images with and without a filter and then finding a 6×3 linear matrix mapping the 6 pixel measurements to the target XYZs (for example). With respect to this double capture scenario, the filter design process is similar (a similar algorithm and one that follows naturally from the ALS method in the given text is used) but the discovered filter will, of course, be different.

Of course, now we need to consider how two images—with and without a filter—are captured. Two images could be taken successively (via a camera with a filter wheel arrangement). For the successive capture scenario the images would then need to be registered so corresponding pixels are in alignment. In a second approach, a neutral beam splitter approach to split the light from a scene into two optical paths and then two images are captured simultaneously (with and without the derived filter). Here, no registration is needed.

BRIEF DESCRIPTION OF THE DRAWINGS

Embodiments of the present invention will now be described, by way of example only, with reference to the accompanying drawings in which.

DETAILED DESCRIPTION

Figure 1:
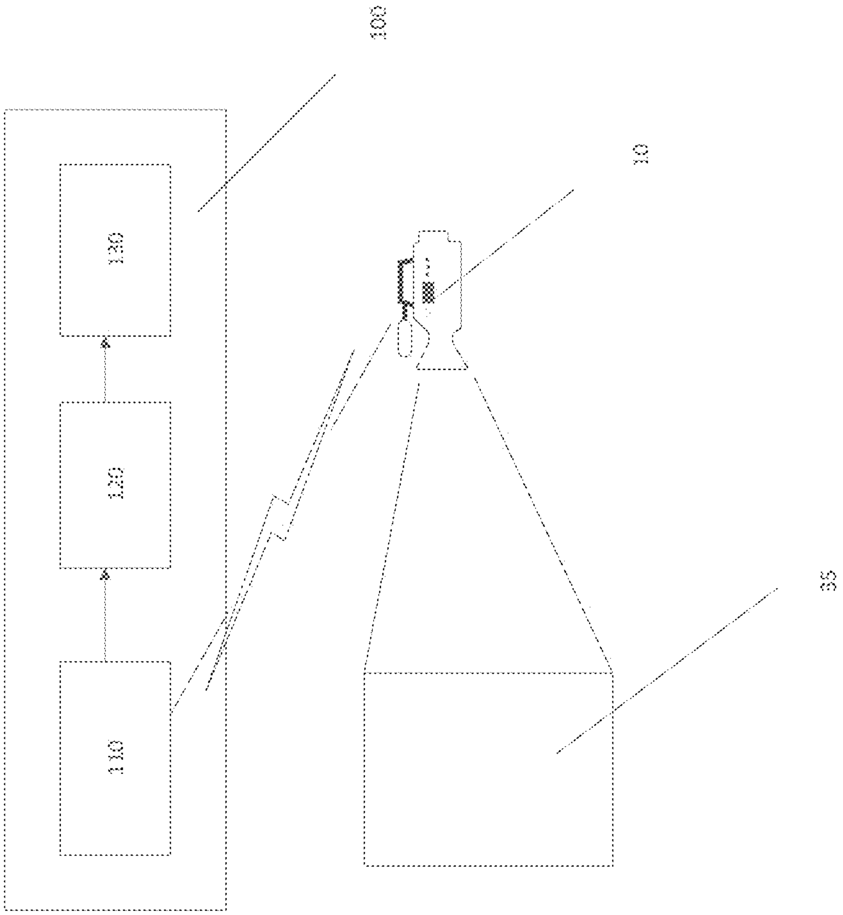
FIG. 1 is a schematic diagram of a system according to an embodiment of the present invention; and, FIGS. 2 and 3 are graphs showing experimental results from testing of filters produced by embodiments compared to non-filtered and prior art approaches.

The method applied in embodiments of the present invention builds upon the Luther condition and is set out in detail below. An optimisation problem is formulated and solved to identify filter parameters that can either be used to produce a filter or to program a lighting system, smartglass or similar.

The color of a pixel formed in a digital camera mainly depends on three physical factors, i.e. the spectral power distribution of the illuminant E(λ), the reflectance factor of the object surface S(λ), and the spectral response curves of the camera, $Q_k(\lambda)$ for each color channel. The color of a pixel, under Lambertian surface model, can be modelled as $$\rho_k = \int_\omega E(\lambda)S(\lambda)Q_k(\lambda)d\lambda,\ k \in \{R, G, B\} \tag{1}$$

where the variable λ is defined in the visible wavelength domain ω and $Q_k(\lambda)$ is the spectral sensitivity curve of channel k in the camera, usually red-, green- and blue-channels.

It is useful to recast the continuous integration into the discrete representation using matrices and vectors. Typically, for imaging application, it is sufficient to sample a spectrum measured within the visible wavelength range between 400 nm and 700 nm for every 10 nm sampling interval.

For a collection of m surface color stimuli under a given illuminant, the camera responses can be concisely readdressed as $$P = S^T \text{diag}(E)Q \tag{2}$$

where the camera RGB values P is an m×3 matrix, the object reflectance S is a 31×m matrix, the illuminant diag(E) is a 31×31 diagonal matrix, and Q is a 31×3 matrix denoting the camera sensitivities over red-, green-, and blue-channels. The superscript $^T$ denotes the matrix transpose.

Similarly, the color values observed by a standard observer can be quantified as $$x = S^T \text{diag}(E)X \tag{3}$$

where x is an m×3 matrix representing the observer color tristimuli and X is a 31×3 matrix denoting the CIE 1931 2° XYZ color matching functions.

The Luther condition requires that the camera sensitivities are within a linear transform from the CIE XYZ color matching functions. Mathematically, we write $$X = QM \tag{4}$$

where M is a full rank 3×3 matrix mapping camera sensitivities to the visual color matches.

If the camera sensitivity curves meet the Luther condition, we can easily prove that their tristimulus color responses are also linear apart:

$$S^T \text{diag}(E)X = S^T \text{diag}(E)QM \Rightarrow X = PM \tag{5}$$

which makes the camera a colorimeter, i.e. the triplet color values produced by the camera can be linearly related to that of the visual tristimulus values.

The Luther condition places a very strong constraint on the sensitivity functions of a camera and in practice, most cameras do not satisfy the Luther condition. But, a 3×3 linear color correction matrix can be found that best maps the RGB responses to the human visual tristimuli.

The best linear mapping matrix is solved as a least-square regression:

$$M = P^+X = (P^TP)^{-1}P^TX \tag{6}$$

where the superscript $^+$ and $^{-1}$ denote respectively the Moore-Penrose inverse and the matrix inverse.

This 3×3 matrix still provides perfect color correction when the reflectances are sufficiently well modeled by a 3D linear model. However, there are many examples of colors that are wrong when recorded by a camera (after color correction) compared to what a human observer perceives viewing the same scene. Furthermore, when the demand of the color accuracy is high and then a linear correction does not suffice.

Let $V=[v_1,v_2,v_3]$ denote a special linear combination of X whose columns are orthonormal basis vectors, $V^TV=I_3$ ($I_3$ is the identity matrix). Matrix V can be calculated from X by the QR factorization or singular value decomposition.

Mathematically, we write X=VH where H is a full rank 3×3 matrix.

By substituting into Equation (4), we can rewrite the Luther condition as $$VH = QM \Rightarrow V = QMH^{-1} \tag{7}$$

where the superscript $^{-1}$ denotes the matrix inverse and $MH^{-1}$ forms a new 3×3 matrix. This equation teaches us that the camera sensitivities Q of which meets the Luther condition should also be within a linear transform from the orthonormal basis V.

Embodiments of the present invention determine parameters for a filter and a linear transform that approximately maps Q to V (see the optimization shown in Equation (12)).

Physically, for a color filter, the filter transmittance must be non-negative and no greater than 1 as $$0 \le f(\lambda) \le 1,\ \lambda \in \omega \tag{8}$$

where f(λ) denotes the filter transmittance at a given wavelength λ, defined on the domain of the visible spectrum ω.

In embodiments of the present invention, we solve for the filter that, in total, transmits a prescribed percentage of the total light (or more).

The average transmittance percentage is defined as:

$$\frac{\int_\omega 1 \cdot f(\lambda)d\lambda}{\int_\omega 1 d\lambda} \tag{9}$$

which calculates the ratio between the amount of a uniform white light (which has a value of 1 at any wavelength) a filter transmits over the visible spectrum against that when no filter is used.

Equivalently, in the discrete domain, the average percentage transmittance is written as $$\frac{1}{31} f \cdot 1 \tag{10}$$

where · is the inner product between two vectors and 31 is the number of sampling points between 400 nm and 700 nm.

Embodiments are configured such that the average transmittance is larger than a criterion amount $f_{avg}$:

$$\frac{1}{31} f \cdot 1 \ge f_{avg} \tag{11}$$

This may be a system parameter, a user input or provided another way.

Given the filter transmittance vector f and the camera spectral sensitivity functions Q. When we place a filter in front of the camera, the filtered camera sensitivity functions can be modelled as diag(f)Q.

Mathematically, by adopting the formula in Equation (7) and incorporating the filter constraints in Equations (8) and (11), we reformulate the Luther-condition based filter optimization as $$\underset{f,M}{\arg\min}\ \|\text{diag}(f)QM - V\|_F^2, \quad \text{s.t. } 0 \le f \le 1 \text{ and } \frac{1}{31} f \cdot 1 \ge f_{avg} \tag{12}$$

where $$\|\|_F^2$$

denotes the square of the Frobenius norm (i.e. the sum of the squares of all elements in the matrix). M is a 3×3 matrix to be determined.

The filter optimization presented in Equation (12) has no closed-form solution. Fortunately, the filter matrix f and the correction matrix M can be solved iteratively using a technique called the (ALS) regression. Promisingly, the ALS method is guaranteed to converge (although not necessarily to the global optimum).

Initially, we solve for M assuming a uniform filter f=[1,1, . . . ,1]. Given this newly solved M, we update for the filter solution. That is to say, we solve for matrix M by holding the filter f fixed and alternatively using the newly solved matrix M to solve for the filter f and the process will continue updating both matrices in turn until it converges to a predefined error threshold.

Given a known filter vector, the correction matrix can be solved by $$M = (\text{diag}(f)Q)^+ V \tag{13}$$

where $^+$ denotes the Moore-Penrose inverse.

Given a known M, the filter under constraint can be easily converted to a Quadratic problem subject to linear constraints and solved by the Quadratic programming.

In one embodiment, the filter may be generated so as to be robust to the presence of noise (such as shot noise). To achieve this, an additive matrix N that models deviation in signal due to noise. N can be chosen to depend on (after) the filter or be independent thereof. The values in N are typically relatively small compared to the values in Q (and can be both positive and negative). The optimization would then seek a best solution given Q and N that approaches V.

In this plus-noise scenario it is useful to think of the optimisation as attempting to find a filter that best maps a target set of reflectances viewed under a set of lights to best match the corresponding target responses. Respectively, denoting matrices of RGB (which depend on the filter) and XYZ responses as Q(f) and W and a noise independent of the filter by N when we might seek to minimize $$\underset{f,M}{\arg\min}\ \|(Q(f) + N)M - W\|_F^2, \quad \text{s.t. } 0 \le f \le 1 \text{ and } \frac{1}{31} f \cdot 1 \ge f_{avg} \tag{14}$$

Equally, if the noise term also depends on the filter we denote it N(f) and the optimisation is written as $$\underset{f,M}{\arg\min}\ \|(Q(f)+N(f))M-W\|_F^2, \tag{15}$$

$$\text{s.t. } 0\le f\le 1 \text{ and } \frac{1}{31}f\cdot 1\ge f_{avg}$$

As written the easiest algorithmic approach to solving either equation (14) and (15) would be to use a direct search algorithmic solver of which the Nelder-Mead simplex algorithm is an example. For the special case of shot-noise this can be added to the spectra that generate the RGBs and XYZs and in this case noise tolerant filters can be found using the ALS method.

In one embodiment, the predetermined parameter (that controls transmittance sought during optimization), may be varied. For example, it may be varied progressively across a range. The model could be optimized for each value of the parameter and the resultant solutions then also evaluated so as to identify the filter from the solutions that optimises the ratio of filter transmittance over fitting error.

FIG. 1 is a schematic diagram of a system according to an embodiment of the present invention.

The system 100 is configured to generate a color filter (or parameters from which a color filter can be created, selected, configured or simulated) for modifying the spectral response of a vision system.

The system 100 includes an input interface 110 configured to receive an RGB spectral response of the vision system 10 for a color target 35 under predetermined illumination.

The system further includes a processor 120 configured to execute computer program instructions configured to apply the RGB spectral response to a bilinear optimisation problem and solve the problem to simultaneously determine:

i) a color correction matrix to transform the RGB spectral response to XYZ color space; and, ii) parameters of the color filter.

Further, the system includes an output interface 130 configured to provide the parameters for the color filter.

As discussed above, there is no closed form solution to the optimization equation. Rather we solve it, preferably using a technique called Alternating Least-Squares (ALS).

Because solving for the filter or the color correction matrix is solving a least-squares problem, then the error reduces at each stage in the optimization. Further it is well known that Alternating Least-Squares problems also converge.

The optimised filter produced defines per wavelength scalings which, in combination with the discovered linear transform, best matches the second sensor set.

Although generation of a filter may in many cases include creation or selection of a physical filter, it will be appreciated that a filter could also be generated by appropriate control signals to smart glass or other programmable optical filters.

A particularly advantageous feature of the method of embodiments above is that it allows the determination of the best filter that compromises 2 design variables. For example, if we are interested in the best compromise between filter transmission and color error we could seek to find an average transmission value to maximize the ratio $$f_{avg}/\mu(\Delta E^*_{ab})$$

where $$\mu(\Delta E^*_{ab})$$

denotes mean Delta E and the error is calculated over a dataset of lights and surfaces. This type of error is analogous to PSNR (peak signal to noise ration) used in signal processing.

As an example of this kind of optimization, let us take the first 7 rows (of the first column) of Table 1 below and calculate this ratio. The rations of percent transmittance over color error are: 100/1.72≈58, 15/0.38≈39, 50/0.44≈114, 60/0.54=111, 70/0.73≈96, 80/0.97≈82 and 90/1.27≈71. For this data the best performance ratio is for a 50% transmitting filter but the ratio is almost the same for a 60% filter (and, practically, may be chosen as it absorbs less light).

While the focus of embodiments described above has been colorimetric error, we might instead calculate the root mean square error between actual and corrected filtered responses.

To be clear, we can calculate the Delta E error (or any error of choice) for any range of target average filter transmittance at any accuracy (say 1% sampling).

Although the methods presented here minimize the modified Luther condition, other approaches are possible, such as using the techniques set forth in the authors earlier work, the content of which is incorporated in its entirety by reference—G. D. Finlayson and Y. Zhu, "Designing color filters that make cameras more colorimetric," IEEE Transactions on Image Processing, vol. 30, pp. 853-867, 2020. In this paper an approach is set out to find the best average filter transmittance for a corpus of lights and reflectances. Further, the filter may be constrained in shape e.g. so it is smooth.

Another important consideration in filter design is that the desired and designed filter can be fabricated. Using thin film optics, filters generated by embodiments of the present invention can be produced. Relatedly, in Y. Zhu and G. D. Finlayson, "Matched illumination: using light modulation as a proxy for a color filter that makes a camera more colorimetric," Optics Express, vol. 12, no. 6, pp. 22006-22024, 2022, the content of which is incorporated herein in its entirety, it was shown how a tunable multispectral illuminator could be used as a proxy for filter design. Filters generated from embodiments described here can be implemented in this manner as tuning parameters in that framework.

Finally, it is also possible to apply the embodiments to our own visual system. Using the color matching experiment, we can discover the spectral response of an observer. These are known to linearly relate to the cone responses. Should two observers have different (and linearly non-correctable [a linear transform cannot transform the first set of curves to equal the second set]) color responses, then a filter can be designed to correct the response of the first observer to the second. After filter correction the first observer should make the same color matches as the second observer. In this way this method might be applied to correct the vision of a color deficient observer (e.g. anomalous deuteranopes and protanopes).

Experimental Results

The filter optimization was tested out on two representative digital cameras from two well recognized camera manufactucers, a Canon 40D and a Nikon D5100 digital single-lens reflex cameras, with measured spectral sensitivities.

The above described method was used to determine the best filters for each of the testing cameras with gradually levelling up the constraints of the average transmittance: from greater than 50%, 60%, 70%, 80%, 90%, to 100% (100% equivalently means no filter is used) respectively.

In the experiments, the algorithm starts with an initial uniform filter of $f=f_{avg}*[1,1, \ldots ,1]^T$, then solves for a new 3×3 correction matrix M; given this newly solved M, we recalculate the filter solution. The process goes on solving these two unknown matrices in an alternative way. Empirically, the algorithm converges quickly (here we use the stopping criterion: the cost function error between two consecutive iterations is less than 1e-08). In the experiments, it took less than 1 second to compute a converged solution set of the optimal filter and the mapping matrix.

Figure 2:
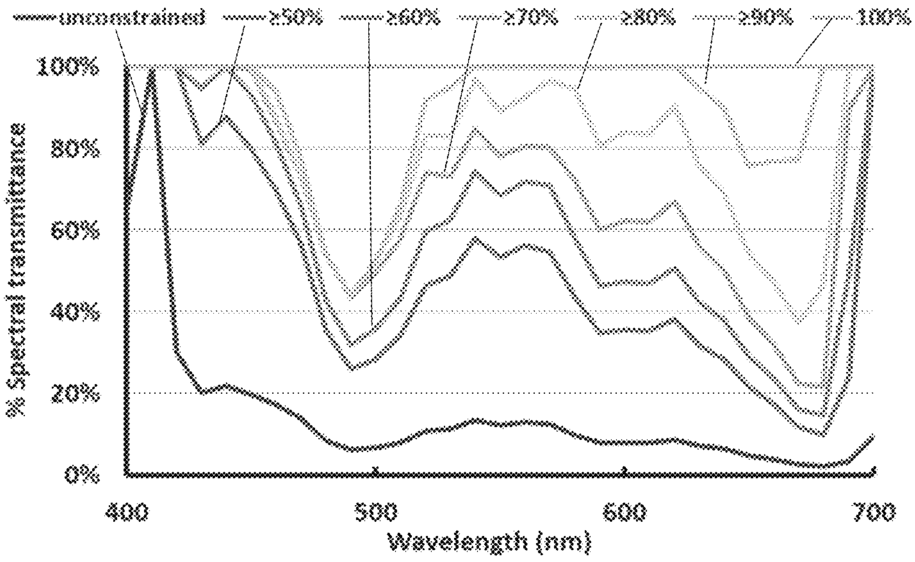
Figure 3:
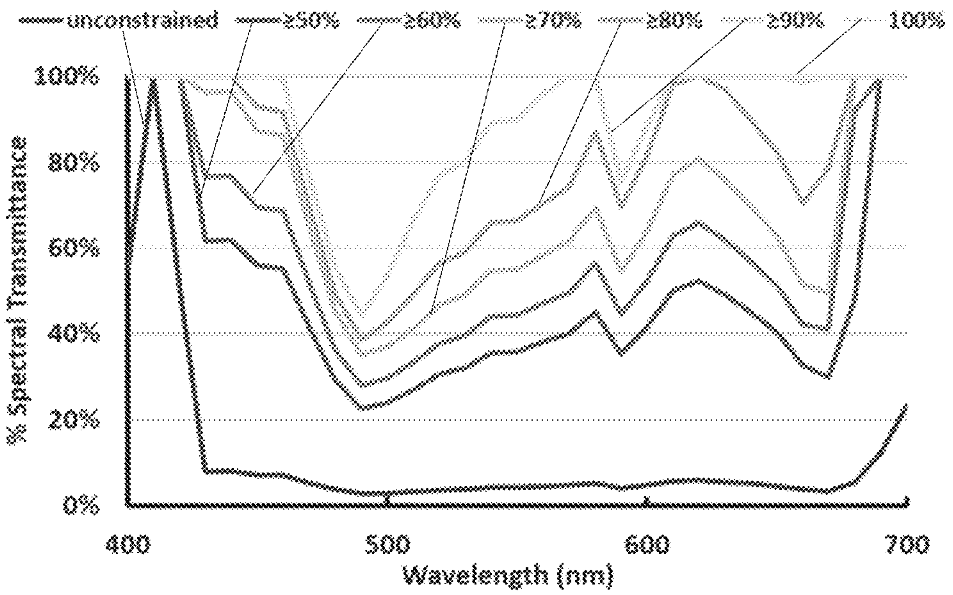

The results are shown in FIGS. 2 and 3 for Canon and Nikon cameras, respectively. The unconstrained filters for both cameras present much lower overall transmittance (the lowest result on both graphs with transmittances over most of the wavelengths less than 20% and the mean transmittance of 15% for the Canon camera and 12% for the Nikon camera respectively).

The filters produced by embodiments of the present invention had a dented peak wavelength of 490 nm which leads to a biological interest as it is close to the absorption wavelength range of the macular pigment. It is a yellow pigment populated in the central fovea of the retina which absorbs most of the light in the range of 450 nm to 500 nm and is seen as a natural notch filter. It makes sense because in the optimization we use the CIE°2 color matching functions as the target sensitivity set for the camera sensitivities to map to, the viewing field of which houses the macular pigments.

More importantly, for the two tested cameras, the derived filters have similar shapes and, significantly, they have (dented) peaks at about 490 nm and 680 nm spectrum. From FIGS. 2 and 3, it can also be seen that the transmittance values at these two peak wavelengths are resistant to change compared to values at other wavelengths when we increase the average transmittance level. The figures demonstrate that the transmittance values at these peaks satisfy the Luther condition and consequently for the performance of color measurement accuracy.

We also evaluate the performance of cameras after using a filter in the color measurement experiment in terms of the perceptual color errors (here we use the color difference metric in the CIELAB color space). The color correction experiments are performed for a set of 102 illuminants and 1995 reflectance spectra. We calculated the RGBs and XYZs of all reflectance spectra under each illuminant according to Equations (2) and (3), and find the best 3×3 correction matrices mapping RGBs to the ground-truth XYZs before converted into CIELAB color space to calculate the difference between the reference and test color values. Then the overall mean, median, 95-percentile and max of $\Delta E_{ab}*$ are averaged over the all test lights.

The color measurement results are given in Table 1 for Canon 40D and Table 2 for Nikon D5100 cameras. As the baseline, we calculate the color errors of the native camera when no filter is used, given in the first row. For comparison purpose, we also show results of the best Luther filter in the second row when no transmittance constraint is applied (its mean transmittance value is given in the parentheses).

TABLE 1

$\Delta E^*_{ab}$ statistics of the color corrected native camera, the color corrected camera with the unconstrained filter, filters under different average constraint levels ($f_{avg}$), and filters under the low transmittance bounds ($f_{min}$) for a Canon 40D camera

| | Mean | Median | 95% | Max |
|---|---|---|---|---|
| Native camera | 1.72 | 1.03 | 5.12 | 28.39 |
| no constraint ($f_{avg}$ = 15%) | 0.38 | 0.20 | 1.23 | 9.86 |
| $f_{avg}$ ≥ 50% | 0.44 | 0.24 | 1.43 | 11.73 |
| $f_{avg}$ ≥ 60% | 0.54 | 0.30 | 1.74 | 13.83 |
| $f_{avg}$ ≥ 70% | 0.73 | 0.38 | 2.33 | 18.18 |
| $f_{avg}$ ≥ 80% | 0.97 | 0.56 | 3.12 | 20.82 |
| $f_{avg}$ ≥ 90% | 1.27 | 0.78 | 4.06 | 21.82 |
| $f_{min}$ ≥ 24% ($f_{avg}$ = 50%) | 0.55 | 0.31 | 1.80 | 12.52 |
| $f_{min}$ ≥ 43% ($f_{avg}$ = 70%) | 0.86 | 0.50 | 2.74 | 17.68 |
| $f_{min}$ ≥ 77% ($f_{avg}$ = 90%) | 1.41 | 0.81 | 4.30 | 24.45 |

TABLE 2

$\Delta E^*_{ab}$ statistics of the color corrected native camera, the color corrected camera with the unconstrained filter and filters under average constraints ($f_{avg}$), and filters under the low transmittance bounds ($f_{min}$) for a Nikon D5100 camera.

| | Mean | Median | 95% | MAx |
|---|---|---|---|---|
| Native camera | 1.66 | 0.90 | 5.30 | 27.66 |
| no constraint ($f_{avg}$ = 12%) | 0.81 | 0.48 | 2.70 | 11.87 |
| $f_{avg}$ ≥ 50% | 0.85 | 0.53 | 2.85 | 14.98 |
| $f_{avg}$ ≥ 60% | 0.86 | 0.53 | 2.88 | 13.41 |
| $f_{avg}$ ≥ 70% | 0.92 | 0.57 | 3.03 | 12.87 |
| $f_{avg}$ ≥ 80% | 1.07 | 0.66 | 3.60 | 16.07 |
| $f_{avg}$ ≥ 90% | 1.28 | 0.77 | 4.19 | 18.83 |
| $f_{min}$ ≥ 26% ($f_{avg}$ = 50%) | 0.92 | 0.57 | 3.10 | 13.47 |
| $f_{min}$ ≥ 43% ($f_{avg}$ = 70%) | 0.96 | 0.60 | 3.20 | 14.32 |
| $f_{min}$ ≥ 75% ($f_{avg}$ = 90%) | 1.41 | 0.80 | 4.46 | 22.29 |

As expected, greater threshold of the average transmittance lead to less effective color accuracy.

However, comparing the results of 2nd and 3rd rows in Table 1, we see that a filter having an average transmittance value of 50% has very close color accuracy compared to the unconstrained filter whose average transmittance is only 15%. The same trend occurs in the Nikon camera as we see a filter having an average transmittance value of 60% has similar performance of an unconstrained filter with the mean transmittance of 12%. Even a filter having an average transmittance value as high as 90% can significantly reduce color errors by about a quarter compared to the results of the native camera.

The tables also include filter results of the prior art approaches where a lower bound is applied on the filter transmittances (See the last three rows of Table 1 and Table 2). Here, $f_{min}$≥24\% means that the filter transmittance at all wavelengths must be no less than 24%. When the lower bound is set to 24%, then the prior art optimization returns a filter that has an overall transmittance of 50%.

It will be seen that the method described above offers a further 10\% increase in color accuracy, for both cameras (when compared at the same overall transmittance level).

It is to be appreciated that certain embodiments of the invention as discussed above may be incorporated at least in part as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention.

The invention claimed is:

1. A method for generating a color filter for modifying the spectral response of a vision system, the method comprising:

receiving an RGB spectral response of the vision system for a color target under predetermined illumination;

generating a model, using the RGB spectral response, of the vision system when subject to a filter, the model including a bounded total transmittance of light by the filter that is set by a predetermined parameter, wherein the bounded total transmittance comprises a bound that the average light power transmitted by the filter must be greater than the predetermined parameter, the predetermined parameter comprising a target percentage, the average light power transmitted comprising:

$$\frac{\int_{\omega} 1 \cdot f(\lambda) d\lambda}{\int_{\omega} 1 d\lambda}$$

or a discrete representation thereof, where f(λ) is filter transmittance at a given wavelength λ, defined on the domain of the visible spectrum ω;

executing, by a processor of a computer system, computer program instructions configured to apply the model to a bilinear optimisation problem that simultaneously determines:

i) a color correction matrix to transform the RGB spectral response to XYZ color space; and, ii) parameters of the color filter;

executing computer program instructions configured for solving the bilinear optimisation problem; and, providing a color filter using the parameters.

2. The method of claim 1, wherein the bounded total transmittance comprises a bound that the average light power transmitted by the filter must be greater than a target percentage.

3. The method of claim 1, wherein the bounded total transmittance comprises average transmittance across the spectral sensitivity of the reference imaging system.

4. The method of claim 1 wherein the RGB and XYZ responses are, respectively, for a camera and the standard observer.

5. The method of claim 1 wherein the RGB and XYZ responses are, respectively, the color matching functions for different human observers.

6. The method of claim 1 wherein the RGB and XYZ responses are, respectively, for a first and second imaging system.

7. The method of claim 1, wherein the RGB spectral response is obtained from an observer with different color response and XYZ color space is determined by an observer of a normal color response.

8. The method of claim 1, wherein the spectral response of the vision system modified by the filter comprises spectral sensitivity.

9. The method of claim 1, wherein the RGB responses are for a color target that is illuminated by a reference set of illuminant spectra and has predetermined surface reflectances, comprising generating a bounded transmittance filter that linearly predicts the responses to the same spectral data for the XYZ imaging system.

10. The method of claim 1, wherein the RGB responses for the product of the light and reflectance spectra are perturbed by a model of spectral noise, comprising generating a bounded transmittance filter that linearly predicts the responses to the noise free spectral data for the XYZ imaging system.

11. The method of claim 1, wherein the RGB responses are for a color target that is illuminated by a reference set of illuminant spectra and has predetermined surface reflectances where the RGB responses are perturbed by a filter-dependent noise component, comprising generating a bounded transmittance filter that linearly predicts the responses to the, noise-free, target spectral data for the XYZ imaging system.

12. The method of claim 1, further comprising constraining the generated filter to be smooth.

13. The method of claim 1, further comprising incorporating models of image noise into the model and solving the bilinear optimization problem to find a solution that is robust to the presence of noise.

14. The method of claim 1, further comprising varying the predetermined parameter across a range of parameter values, solving the bilinear optimization for the model with each varied predetermined parameter and determining a filter from the solutions that optimises the ratio of filter transmittance over fitting error.

15. A system for generating a color filter for modifying the spectral response of a vision system, the system comprising:

an input interface configured to receive an RGB spectral response of the vision system for a color target under predetermined illumination;

a processor configured to execute computer program instructions configured to generate a model, using the RGB spectral response, of the vision system when subject to a filter, the model including a bounded total transmittance of light by the filter that is set by a predetermined parameter, wherein the bounded total transmittance comprises a bound that the average light power transmitted by the filter must be greater than the predetermined parameter, the predetermined parameter comprising a target percentage, the average light power transmitted comprising:

$$\frac{\int_{\omega} 1 \cdot f(\lambda) d\lambda}{\int_{\omega} 1 d\lambda}$$

or a discrete representation thereof, where f(λ) is filter transmittance at a given wavelength λ, defined on the domain of the visible spectrum ω; and, computer program instructions to apply the model to a bilinear optimisation problem and solve the problem to simultaneously determine:

i) a color correction matrix to transform the RGB spectral response to XYZ color space; and, ii) parameters of the color filter; and, an output interface configured to provide the parameters for the color filter.

16. A lighting system comprising a lighting source having a controllable lighting output and a control system, the control system comprising:

a processor configured to execute computer program instructions configured to generate a model, using the RGB spectral output of the lighting source when subject to a filter, the model including a bounded total transmittance of light by the filter that is set by a predetermined parameter, wherein the bounded total transmittance comprises a bound that the average light power transmitted by the filter must be greater than the predetermined parameter, the predetermined parameter comprising a target percentage, the average light power transmitted comprising:

$$\frac{\int_{\omega} 1 \cdot f(\lambda) d\lambda}{\int_{\omega} 1 d\lambda}$$

or a discrete representation thereof, where f(λ) is filter transmittance at a given wavelength λ, defined on the domain of the visible spectrum ω; and, computer program instructions to apply the model to a bilinear optimisation problem and solve the problem to simultaneously determine:

i) a color correction matrix to transform the RGB spectral output to XYZ color space; and, ii) parameters of the color filter; and, an output interface configured to provide the parameters for the color filter to the lighting source to control output of the lighting source.

* * * * *